United States Patent [19]

Cleary

[11] Patent Number: 5,077,631
[45] Date of Patent: Dec. 31, 1991

[54] ELECTRICAL DOOR INTERLOCK SYSTEM AND METHOD

[75] Inventor: Gerard R. Cleary, Fitzroy Falls, Australia

[73] Assignee: Kembla Coal & Coke Pty. Ltd., New South Wales, Australia

[21] Appl. No.: 585,110
[22] PCT Filed: Feb. 2, 1990
[86] PCT No.: PCT/AU90/00035
§ 371 Date: Oct. 4, 1990
§ 102(e) Date: Oct. 4, 1990
[87] PCT Pub. No.: WO90/09691
PCT Pub. Date: Aug. 23, 1990

[30] Foreign Application Priority Data
Feb. 7, 1989 [AU] Australia ............................ PJ2588

[51] Int. Cl.⁵ .................. H01H 9/26; H02H 11/00
[52] U.S. Cl. .................. 361/192; 307/326; 307/113
[58] Field of Search .......... 307/113, 116, 326; 361/179, 189, 192

[56] References Cited
U.S. PATENT DOCUMENTS

| 4,048,666 | 9/1977 | Irie et al. ........................ 361/189 |
| 4,140,929 | 2/1979 | Somerville ...................... 307/326 |
| 4,260,904 | 4/1981 | Horie et al. ..................... 307/113 |
| 4,355,269 | 10/1982 | Burton et al. . |
| 4,378,507 | 3/1983 | Root ................................ 307/326 |
| 4,655,634 | 4/1987 | Loy et al. ........................ 404/84 |
| 4,835,657 | 5/1989 | Parkhomenko et al. . |

FOREIGN PATENT DOCUMENTS

74116/74 12/1975 Australia .
0611259 6/1978 U.S.S.R. ............................ 307/326

Primary Examiner—Steven L. Stephan
Assistant Examiner—Ben Davidson
Attorney, Agent, or Firm—Foley & Lardner

[57] ABSTRACT

A door interlock system and method are disclosed which are suitable for use for permitting electrical energization of power to components within an enclosure (11). If the door is opened, the components are de-energized. The system and method use a supply circuit breaker (5) external of the enclosure (11), and an enclosure circuit breaker (27) within the enclosure. A door sensing circuit (31) comprising an intrinsically safe barrier device senses a door of the enclosure (11) closed by door switch means (33). If the door is opened the door sensing circuit (31) opens a pilot circuit (25) which interrupts pilot circuit current and causes a pilot relay (21) to operate to trip-out the supply circuit breaker (5) thus, de-energizing the enclosure (11). A relay circuit (29) is interconnected with the pilot circuit (25), intrinsically safe barrier device (31) and the enclosure circuit breaker (27) to trip-out the supply circuit breaker (5) or enclosure circuit breaker (27) in response to sensing other electrical faults.

11 Claims, 3 Drawing Sheets

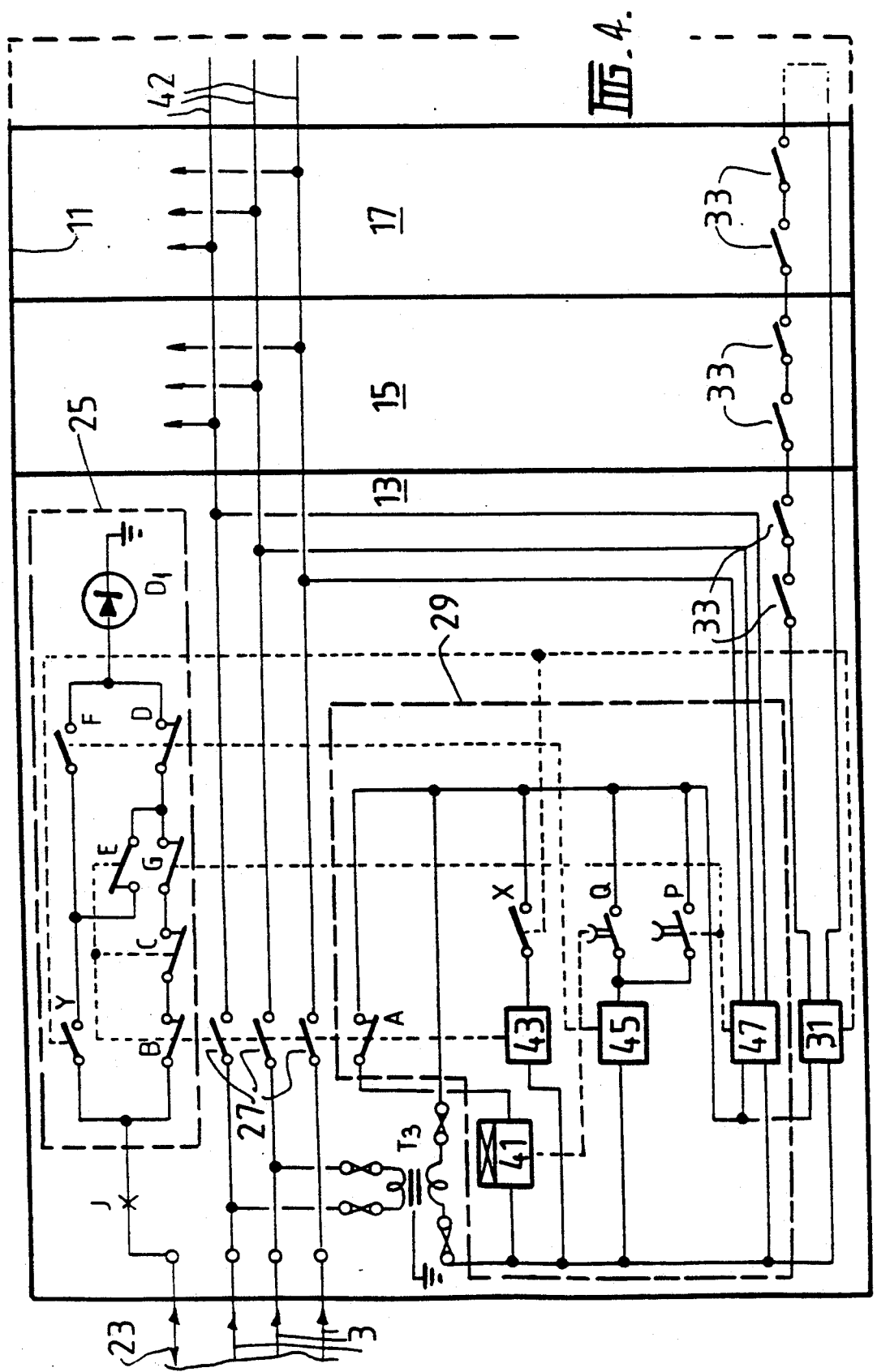

ELECTRICAL DOOR INTERLOCK SYSTEM AND METHOD

FIELD OF THE INVENTION

The present invention relates to a door interlock system and method and relates particularly but not exclusively, to a door interlock system and method for controlling the energization of power to an explosion protected electrical installation and/or enclosure that may be of a fixed or mobile nature.

A system of interlocking enclosure doors on an electrical enclosure so the electrical supply is disconnected from the electrical equipment therein if the doors are opened is a statutory requirement for explosion protection in a hazardous zone. A hazardous zone may be defined as a specified area in which there may be a dangerous concentration of flammable gases, vapours or dusts or other materials. Such areas may be in the coal mining or other mining environments, in the petroleum industry or other industries.

To prevent an explosion which may occur within an explosion proof enclosure from being communicated to the hazardous zone such as a flammable atmosphere, the enclosure must be satisfactorily explosion proof and this is statutorily controlled by ensuring the enclosure is of adequate strength and has special design at the joints. In order that the effectiveness of the joints will be preserved over the life of the equipment, and in particular that such effectiveness will not be impaired by repeated removal of doors or other parts for maintenance or inspection of the equipment within the enclosure, jointing or sealing devices such as gaskets, gland packing and the like, are not generally used. Instead, a minimum width of joint face (flame path) and maximum opening of gap according to the volume of the enclosure and the characteristics of the flammable atmosphere concerned are specified at the joints, shafts, openings, venting devices and the like. This is to ensure that if an explosion occurs within the enclosure, a flame will be restricted or cooled sufficiently during any passage across the joint face so that ignition of the surrounding flammable atmosphere will not occur.

STATEMENT OF PRIOR ART

In known electrical installations in explosion proof enclosures in hazardous environments, mechanical door interlock linkages are used which ensure that before the doors or covers to the enclosures are removed, electrical power is interrupted. Such mechanical door interlocks are generally awkward to use and with time reliability is suspect due to wear, corrosion or distortion of the linkages. More importantly, however, is that it is possible for persons to deliberately override the mechanical interlock linkages so that the enclosure doors can be opened so that the electrical energization will not be interrupted.

Throughout the present specification the term "door" will be used to describe any barrier used to cover an opening for access to an enclosure whether hinged or not.

OBJECTS AND STATEMENT OF THE INVENTION

The present invention has been devised with the object of providing a more reliable door interlock system which is less susceptible to being circumvented by personnel, and which can therefore ensure improved safety in hazardous environments.

According to the present invention there is provided a door interlock system for controlling the electrical energization of components within an enclosure which is closed by a door, the door being openable to permit access to said components, the system comprising:

a power supply circuit breaker connected with a pilot circuit relay means which will trip-out said supply circuit breaker in the event of a current disruption to said pilot circuit relay means, both said power supply circuit breaker and said pilot circuit relay means being external of said enclosure, said pilot circuit relay means being electrically connected to the up-line side of said supply circuit breaker a power supply lead extending from said supply circuit breaker to an enclosure circuit breaker within said enclosure to supply power to energize said components within said enclosure through said enclosure circuit breaker and said supply circuit breaker, a further lead extending from said pilot circuit relay means to a pilot circuit within said enclosure for carrying a pilot circuit current, an intrinsically safe barrier device in said enclosure electrically connected to be energized from the up-line side of said enclosure circuit breaker, said intrinsically safe barrier device having door switch means and pilot circuit switch means, said intrinsically safe barrier device providing a pilot circuit current path in said pilot circuit through said pilot circuit switch means and no pilot circuit current path if the door is open whereby if power is supplied to said enclosure, opening of the door will cause said supply circuit breaker to trip-out.

According to a further aspect of the present invention there is provided a method of controlling the energization of components within an enclosure closed by a door, the door being openable to permit access to said components, the method comprising:

supplying power to a power supply circuit breaker and to a pilot circuit relay means connected therewith, said pilot circuit means being able to trip-out said supply circuit breaker in the event of a current disruption to said pilot circuit relay means, said power supply circuit breaker and said pilot circuit relay means being external of said enclosure, extending a power supply lead from said supply circuit breaker to said enclosure to an enclosure circuit breaker in said enclosure to in turn, permit supply of power through said supply circuit breaker through said enclosure circuit breaker to components in said enclosure extending a further lead from said pilot circuit relay mean to said enclosure to a pilot circuit within said enclosure, providing an intrinsically safe barrier device in said enclosure and energizing it from the up-line side of said enclosure circuit breaker, said intrinsically safe barrier device having door switch means and pilot circuit switch means causing a pilot circuit current to flow through said pilot relay, said further lead and said pilot circuit when the door is closed and, in response to said door being opened and said door switch means operating, causing said intrinsically safe barrier device to operate said pilot circuit switch means to interrupt said pilot circuit current to, in turn, trip-out said supply circuit breaker.

BRIEF DESCRIPTION OF THE DRAWINGS

In order that the present invention can be more clearly ascertained an example of a preferred embodiment of the present invention for use in a hazardous environment in a coal mine will now be described with reference to the accompany drawings wherein:

FIG. 4 is a detailed circuit diagram of an enclosure circuit breaker and associated circuitry shown in FIGS. 1 and 2. FIGS. 3 and 4 should be read in conjunction.

DETAILED DESCRIPTION OF PREFERRED EMBODIMENT

Figure 1:
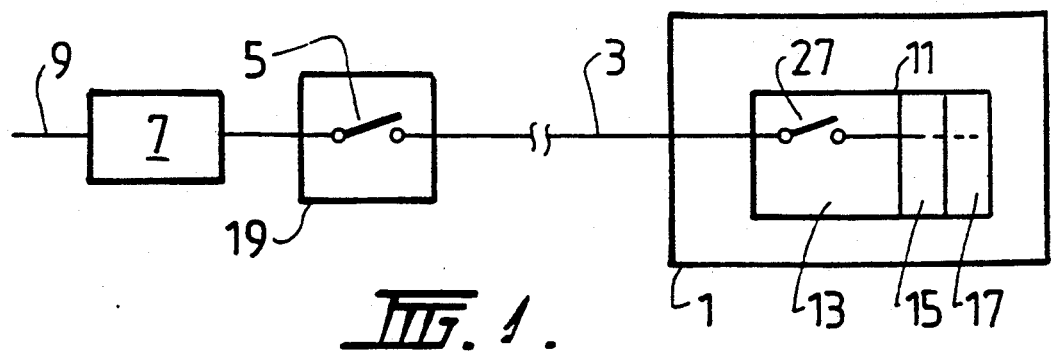
FIG. 1 is a block schematic diagram of the example of the door interlock system.

In FIG. 1 an example of a preferred embodiment of the door interlock system for use in mining environments is shown. Here there is provided a machine 1 which is electrically driven. The machine 1 has power supplied thereto by a long cable 3 which may be for example some several hundred meters in length. Power is supplied to the cable 3 from a supply circuit breaker 5 and power is in turn, supplied to the supply circuit breaker 5 from a power transformer 7 which, in turn, is supplied with power via a cable 9. Typically the power transformer 7 and the supply circuit breaker 5 and the machine 1 are all mounted in a mine. Cable 9 runs from the working level in the mine to the surface. Cable 3 is terminated at the machine 1 in a flame proof enclosure 11 which may have many compartments 13,15,17 etc. which may be closed by a single door or by respective doors for each compartment. The supply circuit breaker 5 is mounted within a distribution box 19 which itself may be explosion protected. In some cases cable 3 may terminate with transformer 7. In this case the supply circuit breaker 5 can be mounted at the transformer 7 or other suitable location.

Figure 2:
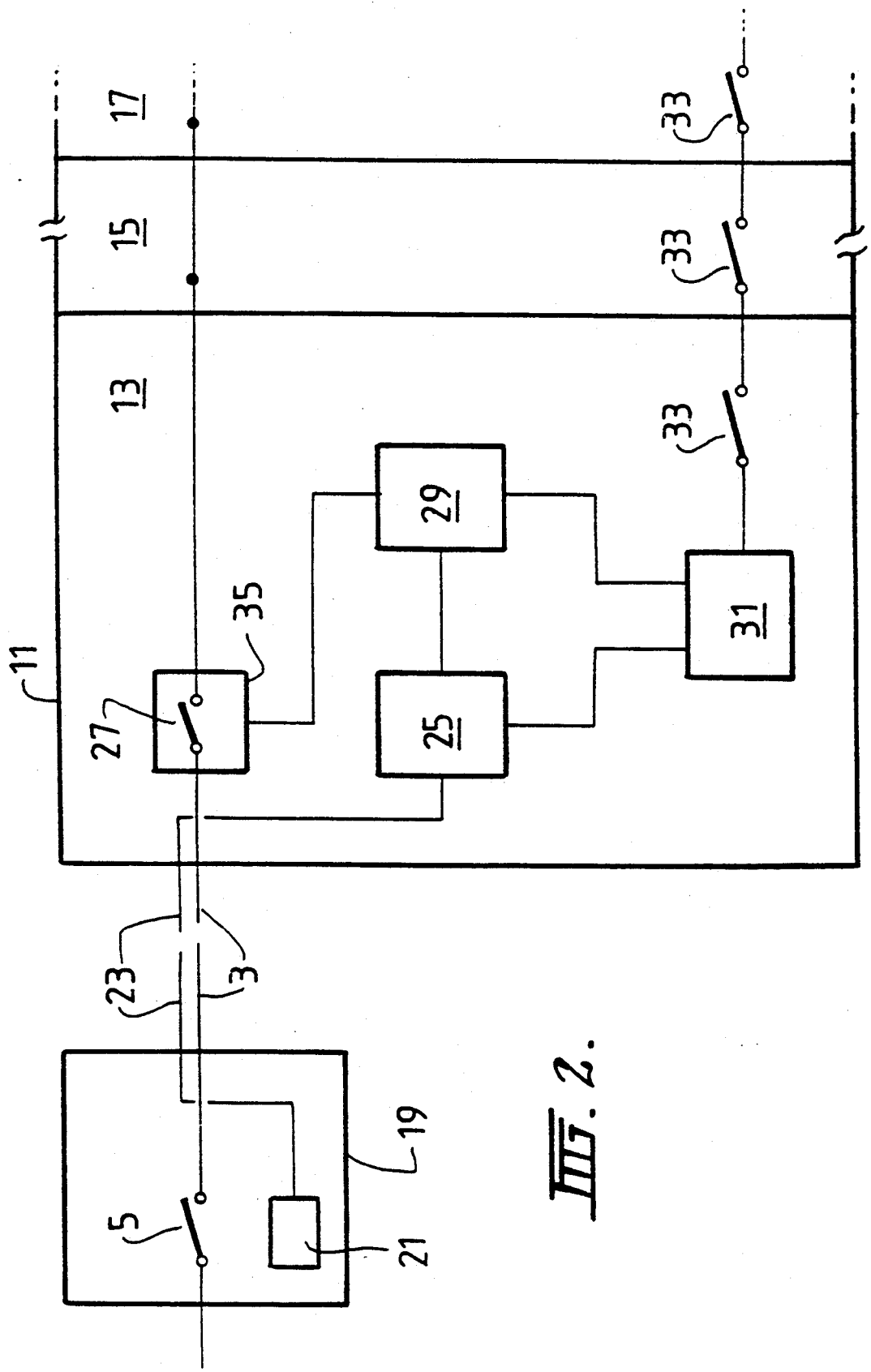
FIG. 2 is a more detailed block circuit diagram of part of the system of FIG. 1.

Referring now to FIG. 2 there is shown a more detailed block circuit diagram than shown in FIG. 1. Here it can be seen that the distribution box 19 contains the supply circuit breaker 5 and a pilot relay 21 which is used for tripping-out the supply circuit breaker 5 in the event of a fault condition being sensed on a cable 23 which can, in turn, sense a fault condition at the enclosure 11 by a pilot circuit 25 in a compartment 13 in enclosure 11 being open circuit. In other words, a pilot current will flow through the pilot relay 21, the cable 23 and pilot circuit 25 under a no fault condition, such as the door being closed but if the door is opened pilot circuit switch means will be opened interrupting pilot circuit current and causing tripping-out of the supply circuit breaker 5. Cable 3 and cable 23 are typically provided within a single cable which is protected against rupture or damage by known cable strengthening techniques. Cable 3 connects directly through terminators with an enclosure circuit breaker 27 in compartment 13 of enclosure 11. The enclosure circuit breaker 27 is operatively connected with a relay circuit 29 within compartment 13. The relay circuit 29 also interconnects with the pilot circuit 25 and also with a door sensing circuit 31 provided within compartment 13. The enclosure 11 may have one or more further compartments 15,17 etc. All of the compartments may be closed by a single door or by respective doors. The doors are sensed closed by switch means 33. Thus, in the case where each compartment 13,15,17 etc. is closed by separate doors, then respective switch means 33 are provided for each door. In practice two serially connected switches are used for sensing the closed condition of each door. Preferably, the switch means 33 are in the closed condition when the doors are closed. If the door or one of the doors are opened then the switch means 33 is opened which, in turn, causes the door sensing circuit 31 to disconnect power by interrupting current flow through the pilot circuit 25 to the pilot relay 21 to trip-out supply circuit breaker 5.

Thus, should the door or doors be opened the pilot circuit 25 will immediately sense absence of pilot circuit current therethrough and disconnect power at the supply circuit breaker 5, to minimise the likelihood of an explosion occurring in the hazardous environment.

The enclosure 11 with each of the compartments 13,15,17 etc. as needed, is a standard type of explosion proof enclosure and accordingly the details will not be disclosed herein as such is considered common knowledge in this art. The enclosure circuit breaker 27 is shown within a block 35 which in block diagrammatic form represents the normal operating solenoid and auxiliary switches for controlling at least the tripping-out or opening of enclosure circuit breaker 27. The details of this will be shown in relation to the other figures.

Figure 3:
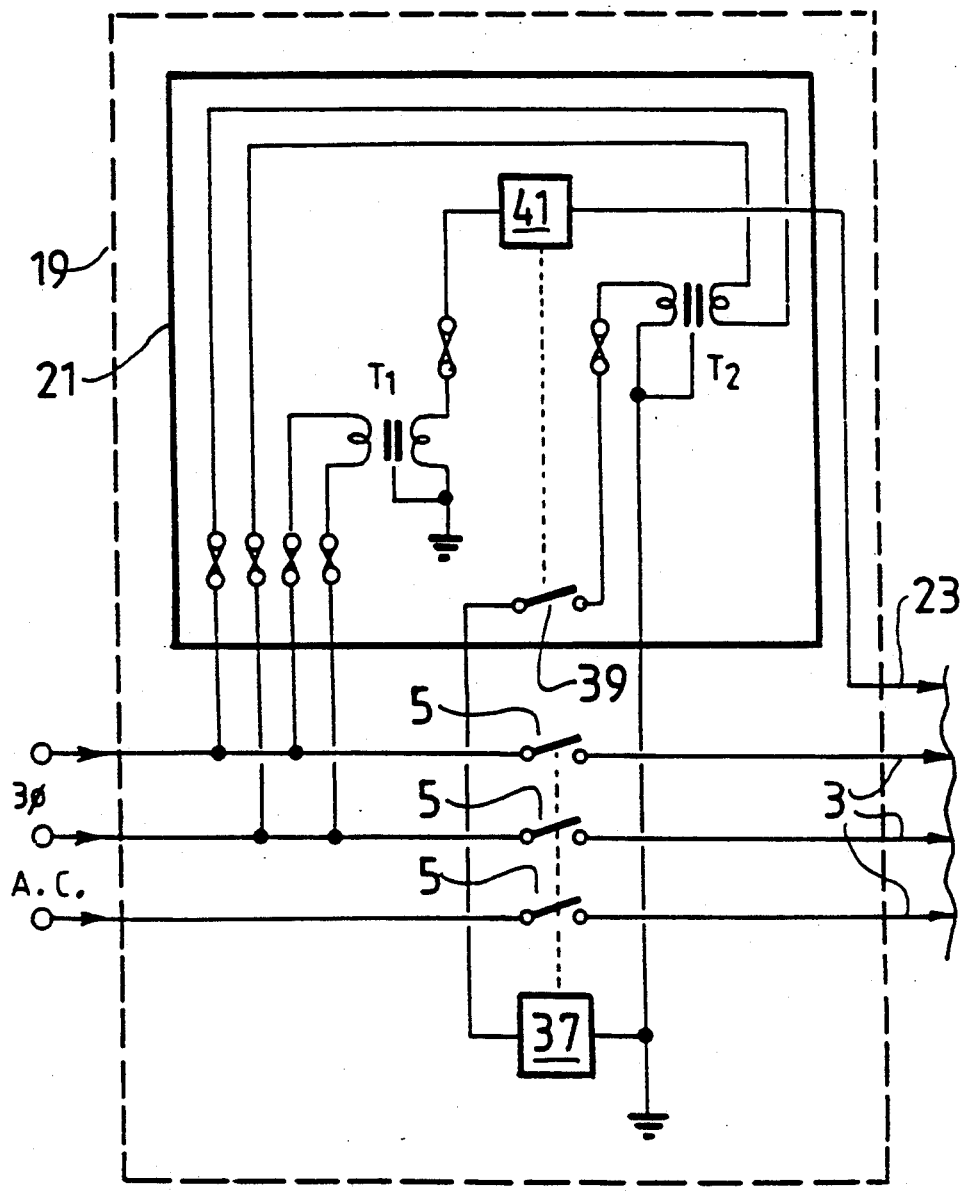
FIG. 3 is a detailed circuit diagram of a supply circuit breaker which has pilot circuit trip-out protection for use in the shown in FIGS. 1 and 2.

Referring now to FIG. 3 there is shown a detailed circuit diagram of the distribution box 19 with the supply circuit breaker 5. Here it can be seen that the supply is in fact a three phase AC supply. The supply circuit breaker 5 is type NZM12 complete with NHi22 and AHi21 auxiliary contacts supplied by Klockner Moeller of 716 Springvale Road, Mulgrave, 3170, Australia. This circuit breaker comes complete with under voltage relay solenoid release and can be either manual or electrically operable to switch into the closed condition. In the environment used herein it is manually switchable into the closed condition. The under voltage relay solenoid is designated by numeral 37. Mounted within the distribution box 19 is the pilot relay 21 which comprises a BRAMCO type CPM1 E2HLUV2110 which is available from Bramco Electronics, 47 Orlando Road, Lambton, New South Wales, 2299, Australia. The pilot relay 21 also includes earth current fault detection circuits and lock-out circuits which have not been shown as these are considered common knowledge in this art. These do not form any part of the inventive concepts herein. In FIG. 3 the power supply for the pilot circuit 25 is shown which comprises an earth continuity circuit through pilot circuit 25 and earth. This power supply forms part of the pilot relay 21. The pilot relay 21 comprises a first transformer T1 and a second transformer T2 each connected to the main supply side of the supply circuit breaker 5 across two phases. The primaries of transformers T1 and T2 are double fused. The cores of each of the transformers T1 and T2 are earthed. The secondary of transformer of T2 is connected in series with a normally open relay switch 39, and the under voltage relay solenoid 37. Relay switch 39 is operated by solenoid 41 which is connected in series with the secondary of transformer T1 and cable 23 which supplies power for an earth continuity pilot circuit current within the pilot circuit 25. The secondaries of transformers T1 and T2 are each fused by a respective single fuse.

Referring now to FIG. 4 there is shown the detailed circuit diagram of the circuitry mounted in the enclosure 11. In this embodiment the circuitry forming part of the present door interlock system is provided in compartment 13 and power is supplied from compartment 13 through the enclosure circuit breaker 27 to each of the compartments 15,17 etc. on buses 42. The electrical control circuity which may be provided within each of the compartments 15,17 etc. has not been shown It can be seen that the pilot circuit 25 is mounted within compartment 13, enclosure circuit breaker 27 is mounted within enclosure 13, relay circuit 29 is mounted within enclosure 13, and the door sensing circuit 31 is also mounted within enclosure 13. Door sensing switch means 33 are provided in each of the compartments 13,15 and 17 and connect with the door sensing circuit 31. All of the switch means 33 are connected in series. The circuit shown in FIG. 4 assumes that there are separate doors for each of compartments 13,15,17 etc. If there is provided only a single door for compartments 13,15,17 etc. then the switch means 33 can conveniently comprise two individual switch means 33 mounted at opposite sides of the enclosure to sense the door being closed. Typically the switch means 33 comprise microswitches which are closed when the door is closed and as such, mechanical defeating is not possible without opening of the door.

The enclosure circuit breaker 27 can comprise circuit breaker type NZM12 complete with NHi22 and AHi21 auxiliary contacts shown as contacts A, B, C, and E supplied by Klockner Moeller at the address previously referred to. All of these contacts are normally closed contacts. When the main contacts of circuit breaker 27 are closed, contacts A, B, C, and E will be open. Switch contacts A and B can be referred to as handle contacts which open and close as the operating handle of the enclosure circuit breaker 27 moves to effect closing and opening respectively of the main contacts. Contacts A have a delay on closing. In practice all of the auxiliary contacts A, B, C, and E are mounted to be activated in response to rotation of the shaft which operates the main contacts in the enclosure circuit breaker 27. The enclosure circuit breaker 27 may be manually or electrically closeable. In the embodiment disclosed herein it is manually closeable.

Power for the relay circuit 29 is supplied from a transformer T3 which has its primary connected across two of the phases of cable 3. The primary is double fused. A timer solenoid 41 is connected across the secondary of transformer T3 through switch contacts A. The timer solenoid 41 is mechanically linked to switch contacts Q which are shown as normally open contacts which are instantly closed but delay on opening. The delay is typically three seconds. The timer solenoid 41 is type LA3-D22A65 by Telemecanique Australia Pty. Ltd., Sydney Australia. An under voltage relay solenoid 43 which forms part of the enclosure circuit breaker 27 is connected across the secondary of transformer T3 through normally open switch contacts X. A solenoid relay coil 45 and normally closed switch contacts D and normally open switch contacts F associated therewith are connected across the secondary of transformer T3 through a parallel circuit arrangement of switch contacts Q previously referred to and normally open switch contacts P. Switch contacts P are instant to close, with a delay on opening of approximately three seconds. A typical solenoid relay for solenoid 45 is type CA2-DN1229-A65 by Telemecanique Australia Pty. Ltd., Sydney, Australia. A frozen contact relay 47 is interconnected across the secondary of transformer T3, and across each of the three phases on the down-line side of the enclosure circuit breaker 27. Any asymmetrical voltages which appear across the phases are sensed by the frozen contact relay 47 which causes it to trip. The frozen contact relay 47 has normally open switch contacts P and normally closed switch contacts G connected therewith. Switch contacts P have a delay on opening. A typical frozen contact relay device is sold under the name BRAMCO type IM1F modified to provide switch contacts P and G with the required functions from Bramco Electronics, previously referred to.

The door sensing circuit 31 comprises an intrinsically safe barrier device 31 type MTL2000 manufactured by Measurement Technology Limited of Powercourt Luton, Bedfordshire, England LU1 3JJ. The intrinsically safe barrier device 31 includes internally fitted normally open switch contacts X and Y. The intrinsically safe barrier device 31 connects with the switch means 33 and in use scans for circuit interruption across switch means 33 by noting current discontinuity. Intrinsically safe barrier devices are statutory defined devices and are well known in this art.

The pilot circuit 25 comprises several pilot circuit current paths depending on the state of the various switches B, C, D, E, F, G and Y therein. The pilot circuit current flowing through the various paths flows through diode $D_1$ to earth. Thus, the pilot circuit 25 under normal conditions, will contain an earth return pilot circuit current along cable 23 and earth. Any interruption of the pilot circuit current will cause the pilot relay 21 at the distribution box 19 to trip-out the source circuit breaker 5.

In use, the system acts to supply power from the power transformer 7 to the distribution box 9 to the machine 1 by first checking for earth pilot current in the pilot circuit 25. Thus, if one or more of the switch contacts B, C, D, E, F, G and Y in the pilot circuit 25 are open causing an interruption of current flow, the supply circuit breaker 5 cannot be closed because of the mechanical interlock devices in the supply circuit breaker 5 which will act to inhibit manual closing until under voltage relay solenoid 37 is energized. When the supply circuit breaker 5 closes power is then supplied to cable 3 which, in turn, supplies power to the enclosure 11 at the machine 1. The enclosure circuit breaker 27 is open at this point of time. The intrinsically safe barrier 31 comprising the door sensing circuit 31 is energized because power is supplied directly from the cable 3 from the up-line side of enclosure circuit breaker 27. The door sensing circuit 31 then scans the switch means 33 to check for circuit continuity. If circuit continuity is sensed, i.e. the door or doors are all closed, then the switch X and pilot circuit switch means Y are closed thereby. When switch X and pilot circuit switch y close, voltage is then supplied to the under voltage relay solenoid 43, to, in turn, permit the enclosure circuit breaker 27 to close. The closing can be effected either manually or electrically. In the embodiment herein the closure is manual. If voltage is not present on the under voltage relay solenoid 43 an attempt to close the circuit breaker will be unsuccessful as mechanical interlock devices in the enclosure circuit breaker 27 will act to inhibit manual closing until the under voltage relay 43 is energized.

The intrinsically safe barrier 31 comprising the door sensing circuit 31 continuously checks the switch means 33 to see they remain closed. In the event one of the switch means 33 is opened and as a result an interruption is provided to the current flowing in the circuit which contains the switch means 33, the intrinsically safe barrier 31 will act to trip-out switch contacts X and pilot circuit switch contacts Y. Interruption of supply voltage across under voltage relay solenoid 43 will cause the enclosure circuit breaker 27 to trip-out thus disconnecting power to each of the enclosures 15 and 17 etc.

The system permits several conditions where power can be supplied and/or disconnected to the enclosure 11.

1. POWER TO BE SUPPLIED WHERE DOORS CLOSED AND THERE ARE NO FAULTS

Pilot circuit 25 continuity is achieved through switch contacts B, C, G and D momentarily, and then through switch contacts B, C, G, E and F, provided the enclosure circuit breaker 27 main contacts are in the off or open condition. Once the intrinsically safe barrier 31 (door sensing circuit 31) scans the switch means 33—the door switches—and continuity is confirmed then switch contacts X and pilot switch contacts Y close allowing the under voltage relay solenoid 43 to be energized and closure of the enclosure circuit breaker 27 to be achieved; pilot circuit current then flowing through switch contacts Y and F.

2. SUPPLY WHERE DOORS ARE OPENED AND ENCLOSURE CIRCUIT BREAKER 27 IS OPEN

This condition may be required for checking the system. In this case, the pilot circuit 25 is held in an operative condition where pilot circuit current can flow by the closed switch contacts B, C, G and F through diode $D_1$ to earth. In this case, the switch contacts D and F are caused to change state by operation of the solenoid coil 45 which is activated as a consequence of switch contacts A being closed, i.e. enclosure circuit breaker 27 being open. This, in turn, pulls-in the timer solenoid 41 which, in turn, closes switch contacts Q, supplying power to the timer solenoid coil 41. Thus, power is able to be applied initially, by the closed switch contacts B, C, G and D. Thus, following operation of the timer solenoid 41 switch contacts B, C, G, E and F close maintaining pilot circuit current through the pilot circuit 25, holding in the supply circuit breaker 5.

Any attempt to close the enclosure circuit breaker 27 will be unsuccessful because the under voltage relay 43 will be de-energized via the open switch contacts X and thus the mechanical interlock which is interconnected with the under voltage relay 43 in the supply circuit breaker 5 will be rendered active to inhibit closing of the enclosure circuit breaker 27. If manual forces are exerted which overcome the mechanical interlocks which would normally prevent closure of the enclosure circuit breaker 27 then the switch contacts A and switch contacts B open and interrupt current flow in the pilot circuit 25 and trip-out the supply circuit breaker 5.

3. POWER IS SUPPLIED AND DOORS ARE OPENED

The intrinsically safe barrier 31 (door sensing circuit 31) senses discontinuity in the switch means 33—the door is opened—which, in turn, causes switch contacts X and Y to open which, in turn, interrupts the flow of current through the pilot circuit 25. This causes the under voltage solenoid 43 to trip-out the enclosure circuit breaker 27 and also causes the pilot relay 21 to operate to trip-out the supply circuit breaker 5.

4. POWER IS SUPPLIED, THE DOORS ARE CLOSED AND THE ENCLOSURE CIRCUIT BREAKER 27 IS TURNED OFF, BUT THROUGH A FAULT, POWER IS SUPPLIED TO ONE OR MORE OF THE PHASES OF THE SUPPLY IN THE ENCLOSURES 13,15,17 ETC. DOWN LINE OF THE ENCLOSURE CIRCUIT BREAKER 27

Under these conditions the frozen contact relay 47 senses the power on one of the phases and asymmetry and, in turn, trips-out switch contacts G. This does not itself upset the pilot circuit 25 as pilot current is still through switch contacts Y and F. As soon as the door is opened, the intrinsically safe barrier 31 (door sensing circuit 31) senses an open condition on one or more of the switch means 33 and trips-out switch contacts X and Y which, in turn, interrupts current in the pilot circuit 25 which then causes the supply circuit breaker 5 to trip-out.

As an alternative to having switch contacts G in series with switch contacts B, C, and D it could be placed at point J. Thus, as soon as the frozen contact relay 47 senses a fault condition it will trip-out switch contacts G and interrupt the pilot circuit current flowing through the pilot circuit 25 and trip-out the supply circuit breaker 5.

Switch contacts Q and P have time delays of about three seconds as referred to previously. These time delays are to inhibit against false tripping of the supply circuit breaker 5 which could be occasioned by:

1. All contacts of the enclosure circuit breaker 27 not opening or closing simultaneously and spurious voltages then being present across the frozen contact relay 47. Such would cause a condition to be sensed which would otherwise effect tripping-out of the supply circuit breaker 5.
2. Back E.M.F. being present on the power supply lines in the cable 3 generated from equipment connected to the power at each of the enclosures 15,17 etc. Thus, whilst the circuit breaker 27 may be open, motors or other devices which are connected can generate back E.M.F.'s which could cause false tripping of the supply circuit breaker 5 which would then be troublesome to reclose as it is normally situated some several hundred meters up-line from the machine 1.

The system can be industrially applied by persons skilled in the art of electrical switch/circuit control gear.

Instead of using solenoid operated relay switch contact devices, solid state switch devices may be used instead and throughout this specification and claims they may be considered direct equivalents and within the scope of the invention.

I claim:

1. A door interlock system for controlling the electrical energization of components within an enclosure which is closed by a door, the door being openable to permit access to said components, the system comprising:

a power supply circuit breaker connected with a pilot circuit relay means which will trip-out said supply circuit breaker in the event of a current disruption to said pilot circuit relay means, both said power supply circuit breaker and said pilot circuit relay means being external of said enclosure, said pilot circuit relay means being electrically connected to the up-line side of said supply circuit breaker a power supply lead extending from said supply circuit breaker to an enclosure circuit breaker within said enclosure to supply power to energize said components within said enclosure through said enclosure circuit breaker and said supply circuit breaker, a further lead extending from said pilot circuit relay means to a pilot circuit within said enclosure for carrying a pilot circuit current, an intrinsically safe barrier device in said enclosure electrically connected to be energized from the up-line side of said enclosure circuit breaker, said intrinsically safe barrier device having door switch means and pilot circuit switch means, said intrinsically safe barrier device providing a pilot circuit current path in said pilot circuit through said pilot circuit switch means and no pilot circuit current path if the door is open whereby if power is supplied to said enclosure, opening of the door will cause said supply circuit breaker to trip-out.

2. A door interlock system as claimed in claim 1 including relay circuit means for said enclosure electrically connected to be energized from the up-line side of said enclosure circuit breaker, said relay circuit means having switch means in said pilot circuit means, said relay circuit means sensing for electrical fault conditions other than door open conditions and being for opening said switch means in said pilot circuit in the event of sensing a fault so said pilot circuit current will be interrupted to, in turn, cause said pilot relay to trip-out said supply circuit breaker 3. A door interlock system as claimed in claim 2 wherein said relay circuit means includes an under voltage relay means to trip-out said enclosure circuit breaker in the event of an under voltage, said under voltage relay means being powered through switch means which are closeable in response to said intrinsically safe barrier device sensing the door closed.

4. A door interlock system as claimed in claim 3 wherein said relay circuit means includes a frozen contact relay device which is connected to check voltage supplied to components within said enclosure on the down-line side of said enclosure circuit breaker and to open normally closed switch means in said pilot circuit in response to detecting a voltage fault whereby to interrupt said pilot circuit current to cause said supply circuit breaker to trip-out.

5. A door interlock system as claimed in claim 4 wherein said relay circuit means includes a further relay means connected in series with a pair of normally open switch means connected in parallel which have a delay on opening, power being supplied to said further relay means when either or both switch means are closed, one of said switch means being closeable by said frozen contact relay device when no voltage fault is detected thereby, and the other said switch means being closeable by a timer relay means in said relay circuit means to which power is supplied through normally closed switch means which open when said enclosure circuit breaker closes, said further relay means closing normally open switch means in said pilot circuit and opening normally closed switch means in said pilot circuit when energized said normally closed switch means permitting pilot circuit current to initially flow in said pilot circuit for closing of said supply circuit breaker; and said normally open switch means acting to maintain said pilot circuit current when said further relay means is energized.

6. An interlock system as claimed in claim 1 wherein said enclosure has a number of individual compartments, said enclosure circuit breaker, said pilot circuit, and said intrinsically safe barrier device all mounted in one compartment, and wherein power is supplied to bus means in the other compartments from said enclosure circuit breaker when said enclosure circuit breaker is closed.

7. An interlock system as claimed in claim 6 wherein each compartment is closed by a respective door and wherein each compartment is provided with respective door switch means.

8. An interlock system as claimed in claim 6 wherein said relay circuit means and the switch means in said pilot circuit act to permit power to be supplied to said enclosure circuit breaker if the door is open and said enclosure circuit breaker is open so as to permit servicing of said system.

9. A method of controlling the energization of components within an enclosure closed by a door, the door being openable to permit access to said components, the method comprising:

supplying power to a power supply circuit breaker and to a pilot circuit relay means connected therewith, said pilot circuit means being able to trip-out said supply circuit breaker in the event of a current disruption to said pilot circuit relay means, said power supply circuit breaker and said pilot circuit relay means being external of said enclosure, extending a power supply lead from said supply circuit breaker to said enclosure to an enclosure circuit breaker in said enclosure to in turn, permit supply of power through said supply circuit breaker through said enclosure circuit breaker to components in said enclosure extending a further lead from said pilot circuit relay means to said enclosure to a pilot circuit within said enclosure, providing an intrinsically safe barrier device in said enclosure and energizing it from the up-line side of said enclosure circuit breaker, said intrinsically safe barrier device having door switch means and pilot circuit switch means causing a pilot circuit current to flow through said pilot relay, said further lead and said pilot circuit when the door is closed and, in response to said door being opened and said door switch means operating, causing said intrinsically safe barrier device to operate said pilot circuit switch means to interrupt said pilot circuit current to, in turn, trip-out said supply circuit breaker.

10. A method as claimed in claim 9 further comprising providing a relay circuit means in said enclosure for sensing electrical fault conditions other than door open conditions, sensing an electrical fault condition therewith and interrupting pilot circuit current in said pilot circuit by opening of switch means in said pilot circuit in response to said sensing.

11. A method as claimed in claim 10 comprising operating switch means in said pilot circuit to permit power to be supplied to said enclosure circuit breaker and said relay circuit means when said door is open and said enclosure circuit breaker is open to permit servicing of said system.

* * * * *